United States Patent [19]

Gordon et al.

[11]  4,290,896

[45]  Sep. 22, 1981

[54] DEWATERING FINE COAL SLURRIES USING ORGANOPOLYSILOXANES

[75] Inventors: David J. Gordon, Essexville; James K. Wessel, Midland, both of Mich.

[73] Assignee: Dow Corning Corporation, Midland, Mich.

[21] Appl. No.: 153,809

[22] Filed: May 27, 1980

[51] Int. Cl.$^3$ ............................................... C02F 1/56
[52] U.S. Cl. ................................. 210/710; 210/729; 210/732; 210/770; 210/778; 209/5
[58] Field of Search ............... 209/5; 210/42 R, 45, 210/49, 51-54, 68, 75, 702, 703, 710, 712, 725, 727, 728, 729, 732, 770, 771, 778; 260/29.2 M, 37 SB; 528/35; 34/12, 14

[56] References Cited

U.S. PATENT DOCUMENTS

| | | | |
|---|---|---|---|
| 2,587,636 | 3/1952 | MacMullen | 260/29.2 M |
| 3,294,725 | 12/1966 | Findlay et al. | 260/37 SB |
| 3,700,715 | 10/1972 | Berger | 210/54 |
| 3,729,496 | 4/1973 | Berger | 210/54 |
| 3,817,861 | 6/1974 | Slusarczuk et al. | 210/54 |
| 3,946,061 | 3/1976 | Buckman et al. | 210/54 |
| 4,026,880 | 5/1977 | Mitchell | 209/5 |
| 4,210,531 | 7/1980 | Wang et al. | 210/53 |

FOREIGN PATENT DOCUMENTS 2149329  4/1972  Fed. Rep. of Germany ........ 210/54

*Primary Examiner*—Peter A. Hruskoci
*Attorney, Agent, or Firm*—George A. Grindahl

[57] ABSTRACT

Aqueous slurries of fine coal are dewatered by a process which comprises mixing an organopolysiloxane with the slurry, separating the slurry to recover the fine coal and further drying the fine coal, if desired. The use of water-soluble organopolysiloxanes or water-emulsifiable organopolysiloxanes provides improved separating and/or improved drying of fine coal in the dewatering process that is disclosed.

13 Claims, No Drawings

DEWATERING FINE COAL SLURRIES USING ORGANOPOLYSILOXANES

BACKGRUND OF THE INVENTION

The present invention relates to a process for dewatering fine coal. In one aspect, this invention relates to a process for filtering an aqueous slurry of fine coal. In another aspect, this invention relates to a process for drying fine coal.

In the mining, cleaning and transporting of coal, considerable quantities of water and fine coal are processsed. For example, continuous coal mining, which uses large quantities of water, produces wet coal which is finer and dirtier than coal produced by other mining processes. Additionally, coal-cleaning frequently includes water-washing, crushing and froth-floating which produce slurried fine coal. Furthermore, transporting coal in water-slurry form is sometimes practiced.

Fine coal is dewatered for various reasons, such as to improve its storing, handling and burning. This dewatering of fine coal is currently done by centrifuging and/or filtering a slurry of fine coal and evaporating water from wet coal obtained thereby. Centrifuging or filtering an aqueous slurry can produce fine coal having a water content of approximately 15 to 20 percent by weight. Drying can remove up to 100 percent of the surface water of fine coal. For example, drying of fine coal at 90° C. to constant weight provides fine coal having a surface water content of zero percent, although capillary water may still be present.

For the purposes of this disclosure, the term fine coal means coal that will pass through a 28 mesh screen; the term water content means the total amount of surface water in a coal sample, excluding capillary water in the coal; and the term dewatering is generic to separating, such as filtering or centrifuging, and drying, such as evaporating, heating or blowing.

Because thermal drying of fine coal requires considerable energy and adds to air pollution, the centrifuging and filtering of fine coal slurries have received extensive and intensive study by the industry with the objective of decreasing the water content of the coal to the extent that thermal drying can be reduced or eliminated. While the mechanical aspects of centrifuging and filtering a slurry of fine coal such as slurry throughput, slurry temperature, slurry concentration, air flow, pressure differential, centrifuge speed and disk speed have received considerable attention, the chemical aspects thereof have received only slight attention.

It has been known for a long time that the use of certain surfactants improve the dewatering of fine coal via filtering. For example, small amounts of sodium lauryl sulfate, mixed with a fine coal slurry to be filtered or, alternatively, sprayed as an aqueous solution on a filter cake of fine coal, produces a drier product than the product obtained by unmodified filtration. On the other hand, the use of lauryl ammonium bromide as the surfactant is substantially ineffective in the same experiment.

However, the use of surfactants is not completely satisfactory. For example, sodium lauryl sulfate can cause undesirable foaming of the slurry, and blinding of the filter during the filtering process.

SUMMARY OF THE INVENTION

It is an object of the present invention to provide a process for dewatering an aqueous slurry of fine coal. It is a further object of the present invention to provide a process for filtering a slurry of fine coal. It is another object of this invention to provide a process for drying fine coal.

These and other objects, which will become obvious to one skilled in the coal-preparing art upon consideration of the following specification and appended claims, are obtained by mixing an effective amount of certain organopolysiloxanes into an aqueous slurry of fine coal, separating the resulting mixture to remove water and, optionally, drying the separated fine coal.

Surprisingly, the process of this invention not only provides fine coal that is drier than conventionally prepared fine coal, after separation from its aqueous slurry, but it also provides fine coal that is more readily dried than fine coal that has been prepared conventionally.

Thus, the present invention comprises two aspects; i.e., a process for dewatering an aqueous slurry of fine coal to provide, in one aspect, fine coal having a water content of less than 20 percent by weight and, in another aspect, dewatered fine coal that is more readily dried.

DETAILED DESCRIPTION OF THE INVENTION

The present invention relates to a process for dewatering an aqueous slurry of fine coal, said process comprising (I) mixing a dewatering-improving amount of a water-dispersible organopolysiloxane with the aqueous slurry of fine coal, (II) separating the organopolysiloxane-containing aqueous slurry of fine coal into an aqueous portion and a fine coal portion, said fine coal portion having a water content of less than 20 percent by weight and, optionally, (III) drying said fine coal portion to further reduce the water content thereof.

The present invention is applicable to any aqueous slurry of fine coal comprising from 20 to 95 percent by weight of water. Preferably, the aqueous slurry of fine coal to be dewatered has a water content of from 50 to 90 percent by weight because fine coal slurries having less than 50 percent water are difficult to pump and slurries having more than 90 percent water are less economical to dewater.

The process of this invention is particularly useful for dewatering an aqueous slurry of fine coal having a water content of from 65 to 75 percent by weight, such as the float product that is obtained from a conventional froth flotation cell that is used in a coal-cleaning process.

Other examples of aqueous fine coal slurries that can be dewatered by the process of this invention include fine coal transported in slurry form, overflow product and underflow product of classification cyclones, and thickener underflow.

Preferably the fine coal in the aqueous slurry to be dewatered has been deslimed and has a particle size of from 28 to 200 mesh.

Organopolysiloxanes which are useful in the process of this invention have the formula $R_aH_bSiO_{(4-a-b)/2}$ wherein a and b are numbers, the sum of which has an average value of from greater than zero to less than four, preferably from 0.9 to 2.5, b has an average value of from zero to a and R denotes an organic radical bonded to a silicon atom by a silicon-carbon bond. It is contemplated that a small portion of the R radicals, such as siloxane-chain terminal radicals, may be silicon-atom-bonded hydroxyl radicals and/or organic radicals bonded to a silicon atom by way of a hydrolyzable bond, such as a silicon-oxygen bond or a silicon-nitrogen bond.

R denotes any organic radical, such as any hydrocarbon radical such as any alkyl, alkenyl, alkynyl, cycloaliphatic, aryl or arylalkyl radical, or any substituted hydrocarbon radical wherein said substituents include halogen, hydroxy, alkoxy, aryloxy, carboxy, carbalkoxy, amino, substituted amino, polyalkyleneoxy, mercapto, substituted mercapto, polyalkyleneimine, amido, nitro, and the like.

Specific examples of organic radicals that are contemplated as R radicals in the organopolysiloxane that is used in this invention include $CH_3$, $CH_3CH_2$, $CH_3CH_2CH_2$, $(CH_3)_2CH$, $C_6H_{11}$, $C_6H_5$, $CH_2=CH$, $CH_3C_6H_4$, $ClCH_2CH_2CH_2$, $Cl_2C_6H_3$, $CF_3CH_2CH_2$, $HO_2CCH_2SCH_2CH_2$, $HO_2CCH_2CH_2$, $HO_2CCH(CH_3)CH_2$, $HSCH_2CH_2CH_2$, $H_2NCH_2CH_2CH_2$, $H_2NCH_2CH_2NHCH_2CH_2CH_2$,

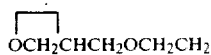

$(HOCH_2CH_2)_2NCH_2CH_2CH_2$, $HO(CH_2CH_2O)_nCH_2CH_2CH_2$, $CH_3O(CH_2CH_2O)_nCH_2CH_2CH_2$, $CH_3CO_2(CH_2CH_2O)_nCH_2CH_2CH_2$, $HO(CH(CH_3)CH_2O)_mCH_2CH_2CH_2$, $CH_3O(CH(CH_3)CH_2O)_mCH_2CH_2CH_2$, $CH_3CO_2(CH(CH_3)CH_2O)_mCH_2CH_2CH_2$ and $HO(CH(CH_3)CH_2O)_m(CH_2CH_2O)_nCH_2CH_2CH_2$ wherein m and n have average values of from 2 to 20.

Although it is believed that the organopolysiloxane may contain any R radical or mixture of R radicals noted above, it is preferred that at least 50 percent of all R radicals in the organopolysiloxane are the methyl radicals.

Examples of the types of organopolysiloxane that are encompassed by the above formula include linear polymers of the formula $R_3SiO(R_2SiO)_dSiR_3$, wherein d is a number from 1 to 1000, resinous polymers of the formula $(RSiO_{3/2})_d$, branched polymers of the formula $R_eSi\{(OSiR_2)_dOSiR_3\}_{4-e}$, wherein e is 0 or 1, cyclic polymers of the formula $(R_2SiO)_f$, wherein f is a number from 3 to 10, and silica copolymers having $R_3SiO_{\frac{1}{2}}$ siloxane units and $SiO_{4/2}$ siloxane units.

Examples of organopolysiloxanes bearing both hydrocarbon and substituted hydrocarbon radicals that are suitable for use in the process of this invention include $Me_3SiO(Me_2SiO)_i(MeGSiO)_j(MeHSiO)_kSiMe_3$; $GMe_2SiO(Me_2SiO)_iSiMe_2G$, and $GMe_2SiO(Me_2SiO)_i(MeGSiO)_j(MeHSiO)_kSiMe_2G$, wherein Me denotes a methyl radical, G denotes a substituted hydrocarbon radical, such as a polyoxyalkylene-substituted radical, such as $HO(CH_2CH_2O)_{12}CH_2CH_2CH_2$ or $HO(CH(CH_3)CH_2O)_{2.5}CH_2CH_2CH_2$, or an amino-substituted radical, such as $H_2NCH_2CH_2NHCH_2CH_2CH_2$ or a carbonyl substituted radical, such as $HO_2CCH_2SCH_2CH_2$, and i, j, and k each denote a number having an average value of from 0 to 100. More specific examples are disclosed by the Examples provided hereinafter.

Examples of organopolysiloxanes bearing hydrocarbon radicals which are suitable for use in the process of this invention include $HOMe_2SiO(Me_2SiO)_dSiMe_2OH$, $(MeSiO_{3/2})_d$, $Me_3SiO(Me_2SiO)_dSiMe_3$, $Me_3SiO(Me_2SiO)_i(MeHSiO)_jSiMe_3$, $PhMeViSiO(Me_2SiO)_dSiViMePh$ and $\{(Me_3SiO_{\frac{1}{2}})_{0.7}(SiO_{4/2})\}_d$ wherein Ph, Me and Vi denote, respectively, the phenyl, methyl and vinyl radicals and d, i, and j are as noted above. More specific examples are disclosed in the Examples provided hereinafter.

The organopolysiloxanes that are useful in the process of this invention may be prepared by any of the methods disclosed in the art. Most useful organopolysiloxanes have been disclosed in the voluminous organopolysiloxane art; many are commercially available.

The organopolysiloxane that is used in the process of this invention must be water-dispersible; that is to say, said organopolysiloxane must be soluble in water or emulsifiable in water. A water-emulsifiable organopolysiloxane may be self-emulsifying or it may be emulsified with the aid of one or more surfactants or it may be prepared in emulsified form by emulsion polymerization of a suitable monomer.

In the process of this invention the water-dispersible organopolysiloxane may be mixed with the aqueous slurry of fine coal in an undiluted form or in a diluted form, such as in an aqueous solution or in an aqueous emulsion. Water-emulsifiable organopolysiloxanes are preferably not mixed with the aqueous slurry of fine coal in the undiluted form.

Because so little organopolysiloxane is used in the process of this invention, it is preferred that the organopolysiloxane be mixed with the aqueous slurry of fine coal in diluted form, such as in a solution or emulsion comprising less than 50 percent organopolysiloxane. Mixing the organopolysiloxane with the aqueous slurry of fine coal in a diluted form is also thought to provide a more uniform distribution of the organopolysiloxane throughout the slurry and on the particles of fine coal therein.

It is also within the scope of and spirit of this invention to mix the organopolysiloxane with an aqueous phase prior to the slurrying of fine coal therein to provide a uniform distribution of organopolysiloxane in the aqueous slurry and on the particles of fine coal that is subsequently slurried therein.

The organopolysiloxane may be mixed with the aqueous slurry of fine coal at any temperature and at any time prior to the separation of the slurry into an aqueous portion and a fine coal portion having a water content of less than 20 percent by weight. It is only necessary to thoroughly mix the organopolysiloxane with the aqueous slurry of fine coal to be dewatered. Preferably the organopolysiloxane is mixed with the aqueous slurry of fine coal after any cleaning step, such as flotation.

The amount of organopolysiloxane to be mixed with the aqueous slurry of fine coal is merely that amount that will improve its dewatering, i.e. the separating of the water from the slurry and/or the drying of the fine coal obtained thereby. Said improvements in dewatering are directed principally to separating more water from the aqueous slurry to provide drier fine coal and/or decreasing the amount of time and/or energy required to dry the fine coal compared to the simple separating processes in the art. However, other dewatering improvements, such as a faster rate of water separation, may also be desired and are suitable criteria within the scope of this invention for determining an effective amount of organopolysiloxane to be used.

It is estimated that the minimum amount of 100% organopolysiloxane that is effective in the process of this invention will vary with the type of organopolysiloxane that is used but will not be less than approximately 0.1 part by weight for every 1000 parts by weight of fine coal in the aqueous slurry and/or less than 0.1 part by weight for every 1000 parts by weight of water in the aqueous slurry.

From a consideration of organopolysiloxane cost, as little organopolysiloxane as is effective should be used. However, from other considerations, such as the maximum rate of separating the aqueous slurry, the maximum rate of drying the separated coal, the maximum amount of water separated from the slurry, the extent to which the separated aqueous portion is used for additional coal processing and the type of separating process that is used, the use of more than a minimally effective amount of organopolysiloxane may be desired.

The most effective amount of any particular organopolysiloxane to be used in the process of this invention to improve the dewatering of the slurry can be determined by performing a few routine tests.

The thoroughly mixed aqueous slurry of fine coal containing an effective amount of organopolysiloxane is subsequently separated into an aqueous portion and a fine coal portion containing less than 20 percent by weight water, based on the total weight of fine coal plus water. By subsequently it is meant immediately or at a later time such as after a period of holding, conditioning, mixing, blending, heating, cooling, transporting, sieving, classifying, or partially dewatering the mixture to be separated.

Any suitable means of separating the organopolysiloxane-containing aqueous slurry of fine coal is contemplated by this invention; such as vacuum filtration, pressure filtration, gravity filtration, solid-bowl centrifugation, screen-bowl centrifugation and suitable combinations of separating means.

The aqueous portion that is obtained from said separating step can be recycled to form another slurry of fine coal, after being rejuvenated with additional organopolysiloxane as needed, in accordance with the process of this invention.

The fine coal portion that is obtained from said separating step, in many cases, needs no further dewatering before it is further processed, such as agglomerated and/or blended and/or utilized. Frequently, however, said fine coal is advantageously further dewatered by drying.

The process of this invention, thus, optionally comprises a drying step to further dewater the fine coal produced thereby. Said drying may be done by any means such as by evaporating, forced air drying, steam drying or heating and suitable combinations of drying means and at any suitable time such as while the fine coal is retained by the separating means such as in the filtering screen, or after it is removed therefrom.

Surprisingly, the drying of fine coal that has been produced by the separating process of this invention occurs more rapidly than the drying of fine coal having the same size-consist that has been produced by the conventional slurry-separating process of the coal-preparing art.

The following examples are disclosed to further teach how to best practice the present invention and not to limit said invention.

Pressures were measured in millimeters of mercury and were converted to kilopascals for this disclosure by multiplying by 133.3324 and rounding off.

Viscosities were measured in centipoise at 25° C. and were converted to pascal-seconds (Pa.s) for this disclosure by multiplying by 0.001 and rounding off.

All parts and percentages are by weight unless otherwise stated.

Fine Coal

Lower Freeport bed coal collected at the Barnes and Tucker Lancashire No. 25 coal preparation plant was used in these examples. The sample was prepared by stage crushing through a roll crusher and a hammer mill to obtain a nominal 35-mesh product. The coal was floated in a standard laboratory Wemco Fagergren flotation cell using a methyl isobutyl carbinol frother and was used in the following examples.

Organopolysiloxanes

The organopolysiloxanes that were used in these examples are denoted therein by identifying letters, which have the following meanings.

A. A 40% emulsion of emulsion-polymerized polydimethylsiloxane (approximately 100 Pa.s) in water comprising approximately 2.5% nonylphenoxypolyethyleneoxyethanol and perpared according to U.S. Pat. No. 3,294,725.

B. A 50% emulsion of emulsion-polymerized polydimethylsiloxane (approximately 125 Pa.s) in water comprising approximately 2% sodium lauryl sulfate, 1% nonylphenoxypolyethyleneoxyethanol and prepared according to U.S. Pat. No. 3,294,725.

C. A water-soluble organopolysiloxane having the approximate average formula $YMe_2SiO(Me_2SiO)_{1.5}SiMe_2Y$ where Y denotes $-(Ch_2)_3(OCH_2CH_2)_{12}OH$.

D. A water-soluble organopolysiloxane having the approximate average formula $Me_3SiO(MeYSiO)_{1.0}SiMe_3$ wherein Y denotes $-(CH_2)_3(OCH_2CH_2)_{12}OH$ E. A 50% emulsion of $Me_3SiO(Me_2SiO)_{67}(MeZSiO)_3-SiMe_3$, where Z denotes $-(CH_2)_3(OCH_2CH(CH_3))_{2.5}OH$, in water comprising approximately 1.5% sodium dioctylsulfosuccinate.

F. A 35% emulsion of $Me_3SiO(Me_2SiO)_{97}(MeXSiO)_3SiMe_3$ where X denotes $-CH_2CH_2SCH_2COOH$, in water comprising 1.4% trimethylnonyl(oxyethylene)$_6$ alcohol, 1.0% octylphenoxy(oxyethylene)$_{40}$ alcohol, 2.75% sodium N-Methyl-N-oleoyl taurate, 1% ethylene glycol, 0.1% sodium benzoate and 0.05% of a biocide.

G. A water-soluble organopolysiloxane having the approximately average formula $YMe_2SiO(Me_2SiO)_{1.5}-(MeXSiO)_{2.4}SiMe_2Y$ wherein Y and X are as denoted in C and H, respectively, above.

H. A 35% emulsion of $Me_3SiO(Me_2SiO)_{98}(MeWSiO)_2 SiMe_3$, where W denotes $-(CH_2)_3NHCH_2CH_2NH_2$, in water comprising 1.9% trimethylnonyl(oxyethylene)$_6$ alcohol and 2.3% octylphenoxy(oxyethylene)$_{40}$ alcohol.

I. A 20% emulsion of $MeSiO_{3/2}$ in water comprising 2% ammoniacal trimethyldodecyl ammonium chloride.

J. Sodium lauryl sulfate

K. Nonylphenoxy(oxyethylene)$_{10}$ alcohol.

Separating Apparatus

In the following examples fine coal slurries were filtered on a glass filter tube which had been fitted with No. 1 Whatman filter paper and connected by way of a shut-off valve, to a vacuum reservoir maintained at a vacuum of 500 mm. of Hg (66.7 kPa).

Preparing and Dewatering Coal Slurries

In the following examples a weighed amount of organopolysiloxane was thoroughly mixed with 100 ml. of water. Twenty-three (23) milliliters of the resulting mixture was added to a 250 ml. Erlenmeyer flask containing a 10 gram sample of 35-mesh coal to provide an organopolysiloxane-containing aqueous emulsion of fine coal having a water content of 70 percent.

The flask was stoppered and shaken for 2 minutes. The slurry was then poured into the above-described filter tube and the shut-off valve to the vacuum reservoir was opened immediately. During filtration the vacuum would fall to 470 to 480 mm. of Hg. (62.7 to 64.0 kPa). This vacuum was maintained for 150 seconds, after which time the filter tube was removed and the filtered coal was weighed ($P_w$) into a drying dish. The drying dish was covered with perforated aluminum foil to eliminate the possibility of losing coal during drying and the covered dish was placed in an air-circulating oven at 90° C. for 90 minutes to completely dry the coal, after which the dry coal was weighed ($P_d$).

The water content of the filtered fine coal was calculated using the following formula where $P_w$ denotes the weight of the filtered coal and $P_d$ denotes the weight of the dried coal.

$$\text{Water Content } (\%) = 100(P_w - P_d)/P_w.$$

The improvement in dewatering that was obtained by the process of this invention, compared to the same dewatering process which used no dewatering additive (control), was calculated using the following formula, where $Q_c$ denotes the water content of the filtered control sample and $Q_i$ denotes the water content of the filtered sample that was produced by the process of this invention.

$$\text{Improvement } (\%) = 100(Q_c - Q_i)/Q_c.$$

EXAMPLES 1 TO 12

In these examples, detailed in Table I, the water that was used to prepare the slurry of fine coal had a temperature of 20° C. The improvement in dewatering during filtration that was obtained by the process of this invention ranged from 17.4 to 39.1 percent and varied with the type and amount of organopolysiloxane used. Filtration of each slurry was substantially complete within 15 seconds, except for the comparative example containing 0.5 grams of sodium lauryl sulfate, which foamed excessively and did not filter completely within the 150 second filtering period. In every example of the process of this invention dewatering of fine coal was improved compared to the control.

EXAMPLES 13 TO 16

In these examples, detailed in Table II, the temperature of the water that was used to prepare the fine coal slurries was 45° C. The improvement in dewatering during filtration that was obtaind by the process of this invention ranged from 3.7 to 27.7 percent.

TABLE II

| | Organopolysiloxane | | | Filtered Fine Coal | |
|---|---|---|---|---|---|
| | | Amount, grams[1] | | | |
| Example No. | Identifier | per 1. H₂O | per kg. coal | Water Content, % | Improvement, % |
| Control | None | 0 | 0 | 17.3 | 0 |
| 13 | D | 0.11 | 0.25 | 14.38 | 16.9 |
| 14 | D | 0.22 | 0.50 | 15.55 | 10.1 |
| 15 | E | 0.22 | 0.50 | 16.66 | 3.7 |
| 16 | H | 0.22 | 0.50 | 12.50 | 27.7 |

[1]Based on 100% organopolysiloxane

EXAMPLES 17 TO 22

These examples, detailed in Table III, show the improvement in the rate of drying of filtered fine coal at 90° C. that was obtained by the process of this invention. For these examples the drying samples from the control example and from examples 1, 2, 3, 10, 11 and 12 of Table I that were being dried were weighed after 30 minutes at 90° C. as well as after 90 minutes at 90° C. These weighings permitted the calculation of the water content of these samples after filtration, as detailed above, and, in a similar calculation, after 30 minutes at 90° C. Note that the fine coal that had been prepared by the process of this invention lost a greater proportion of water in 30 minutes at 90° C. than did the control sample.

TABLE III

| | Sample from | Water Content of Fine Coal, % | | |
|---|---|---|---|---|
| Example No. | Example No. | After Filtering | After Drying @ 90° C./30 min. | Improvement |
| Control | Control | 21.90 | 11.85 | 45.9 |
| 17 | 1 | 15.73 | 1.87 | 88.1 |
| 18 | 2 | 17.29 | 3.79 | 78.1 |
| 19 | 3 | 16.40 | 3.18 | 80.6 |
| 20 | 10 | 16.23 | 2.84 | 82.5 |
| 21 | 11 | 15.97 | 1.49 | 90.7 |

TABLE I

| | Organopolysiloxane | | | Filtered Fine Coal | |
|---|---|---|---|---|---|
| Example No. | Identifier | Amount, grams[1] per 1. H₂O | per kg. coal | Water Content, % | Improvement, % |
| Control | None | 0 | 0 | 21.90 | 0 |
| 1 | A | 0.22 | 0.50 | 15.73 | 28.2 |
| 2 | B | 0.33 | 0.75 | 17.29 | 21.1 |
| 3 | C | 0.22 | 0.50 | 16.40 | 25.1 |
| 4 | C | 0.43 | 1.00 | 15.46 | 29.4 |
| 5 | D | 0.02 | 0.04 | 20.90 | 4.6 |
| 6 | E | 0.52 | 1.20 | 13.34 | 39.1 |
| 7 | E | 0.98 | 2.25 | 14.06 | 35.8 |
| 8 | F | 0.22 | 0.50 | 18.09 | 17.4 |
| 9 | F | 0.48 | 1.10 | 14.56 | 33.5 |
| 10 | G | 0.22 | 0.50 | 16.23 | 25.9 |
| 11 | G | 0.43 | 1.00 | 15.97 | 27.1 |
| 12 | I | 0.22 | 0.50 | 17.18 | 21.6 |
| Comparison | J | 0.22 | 0.50 | 32.44 | −48.1 |
| Comparison | J | 0.02 | 0.04 | 20.6 | 5.9 |
| Comparison | K | 0.02 | 0.04 | 23.0 | −5.0 |

[1]Based on 100% organopolysiloxane

TABLE III-continued

| Example No. | Sample from Example No. | Water Content of Fine Coal, % | | |
|---|---|---|---|---|
| | | After Filtering | After Drying @ 90° C./30 min. | Improvement |
| 22 | 12 | 17.18 | 6.41 | 62.7 |

EXAMPLES 23 TO 25

These examples further show the improvement in the rate of drying of a filtered fine coal slurry at 90° C. that is produced by the process of this invention. A fully dried control sample and fully dried samples from examples 1, 15, and 16 which had been heated to dryness in an air-circulating oven at 90° C. were weighed into 4 oz. squat jars. To each sample was added enough water to normalize the water content at 15%. The jars were then sealed and allowed to stand at 25° C. for 24 hours after which time the seals were removed and the samples were placed in a forced air oven at 90° C. The samples were then weighed at various times to determine the rate at which water was eliminated. The results, tabulated in Table IV, show that the fine coal prepared by the process of this invention is dried more easily than an untreated control sample.

TABLE IV

| Example No. | Sample from Example No. | Water Content of Normalized Wet Fine Coal After Drying at 90° C. for | | | | | |
|---|---|---|---|---|---|---|---|
| | | 0 min | 5 min | 17 min | 27 min | 37 min | 57 min |
| Control | Control | 15.0 | 13.2 | 9.5 | 6.0 | 2.1 | 0 |
| 23 | 1 | 15.0 | 12.0 | 7.1 | 2.9 | 0 | — |
| 24 | 15 | 15.0 | 11.7 | 4.8 | 0.8 | 0 | — |
| 25 | 16 | 15.0 | 12.2 | 5.3 | 1.4 | 0 | — |

EXAMPLE 26

A mixture of 100 parts of pulverized coal and 35 parts of water was blended in a Waring Blender to provide an aqueous slurry of fine coal having a water content of 25.9%. To a portion of this slurry was added 1%, based on the weight of the slurry, of an organopolysiloxane having the formula $Me_3SiO(Me_2SiO)_{8.6}(MeVSiO)_{3.6}SiMe_3$, where V denotes $—(CH_2)_3(OCH_2CH_2)_{7.5}OH$.

When the slurry containing no organopolysiloxane was filtered, 37% of the water was separated. When the slurry containing the organopolysiloxane was filtered, 55% of the water was separated.

That which is claimed is:

1. A process for dewatering an aqueous slurry of fine coal, said process comprising (I) mixing a dewatering-improving amount of a water-dispersible organopolysiloxane with the aqueous slurry of fine coal, said organopolysiloxane having the formula $R_aH_bSiO_{(4-a-b)/2}$ wherein a and b are numbers, the sum of which has an average value of from greater than zero to less than four, b has an average value of from zero to a and R denotes an organic radical bonded to a silicon atom by a silicon-carbon bond, (II) separating the organopolysiloxane-containing aqueous slurry of fine coal into an aqueous portion and a fine coal portion, said fine coal portion having a water content of less than 20 percent by weight, 2. The process of claim 1 wherein said aqueous slurry of fine coal is the product of a flotation process.

3. The process of claim 1 wherein said aqueous slurry of fine coal has a water content of from 65 to 75 percent by weight.

4. The process of claim 1 wherein said separating comprises a filtering process.

5. The process of claim 1 wherein the fine coal portion containing less than 20 percent by weight water is dried by a heating process to further reduce the water content thereof.

6. The process of claim 1 wherein said fine coal has a nominal particle size of 28 to 200 mesh.

7. The process of claims 1, 2, 3, 4, 5 or 6 wherein the water-dispersible organopolysiloxane is a water-soluble organopolysiloxane which is mixed with the aqueous slurry of fine coal as an aqueous solution.

8. The process of claim 7 wherein the water-soluble organopolysiloxane bears at least one silicon-atom-bonded radical having the formula $—CH_2CH_2CH_2(OCH_2CH_2)_{12}OH$.

9. The process of claims 1, 2, 3, 4, 5 or 6 wherein the water-dispersible organopolysiloxane is a water-insoluble organopolysiloxane which is mixed with the aqueous slurry of fine coal as an aqueous emulsion.

10. The process of claim 9 wherein the water-insoluble organopolysiloxane is an emulsion-polymerized polydimethylsiloxane.

11. The process of claim 9 wherein the water-insoluble organopolysiloxane is an emulsion-polymerized polymethylsilsesquioxane.

12. The process of claim 9 wherein the water-insoluble organopolysiloxane bears at least one silicon-atom-bonded radical having the formula $—CH_2CH_2CH_2—(OCH_2CH(CH_3))_{2.5}OH$.

13. A process of claim 9 wherein the water-insoluble organopolysiloxane has the formula $(CH_3)_3SiO\{(CH_3)_2SiO\}_{98}\{(CH_3)(W)SiO\}_2Si(CH_3)_3$ wherein W denotes $—(CH_2)_3NHCH_2CH_2NH_2$.

* * * * *